Oct. 25, 1938.                 D. C. HEITSHU                2,134,664
                                  PLANTER
                        Original Filed July 27, 1935

INVENTOR.
DANIEL C. HEITSHU
BY James A. Walsh
ATTORNEY

Patented Oct. 25, 1938

2,134,664

UNITED STATES PATENT OFFICE 2,134,664

PLANTER

Daniel C. Heitshu, Racine, Wis., assignor to J. I. Case Company, Racine, Wis., a corporation Original application July 27, 1935, Serial No. 33,451. Divided and this application February 24, 1936, Serial No. 65,216

3 Claims. (Cl. 221—118)

My present invention relates to improvements in that class of implements known as walking planters of the character disclosed in my copending application Serial No. 33,451, filed July 27, 1935, of which this is a divisional application, and particularly to simple and effective seeding mechanism which by slight modification may be utilized for planting a variety of row crops such as cotton, beans, corn, peanuts, peas and the like, whereby one implement may be utilized for planting several crops which heretofore, so far as I am aware, have required more than one such implement according to the size and character of the seeds or grain to be planted.

Figure 1:
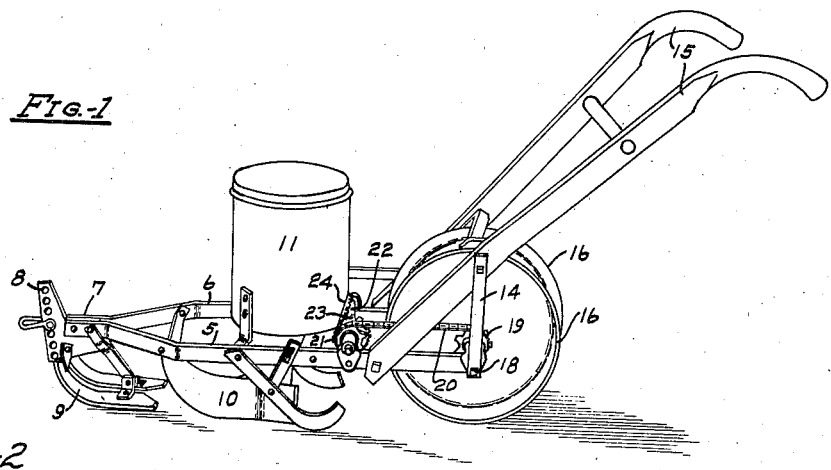
Figure 2:
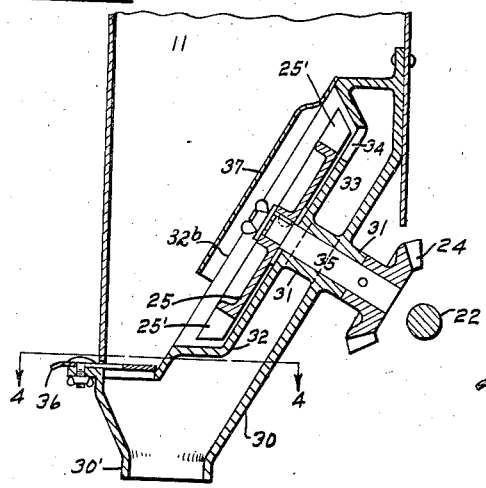
Figure 3:
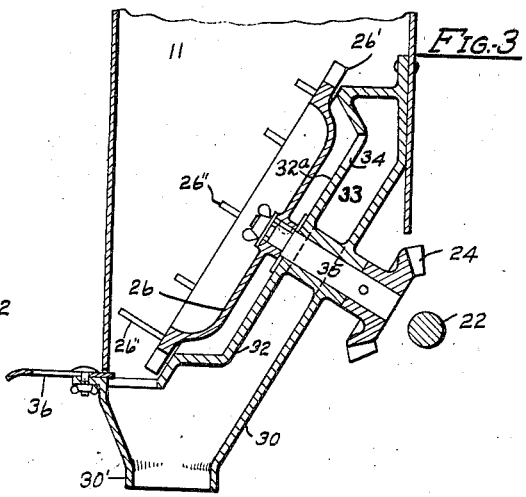
Figure 4:
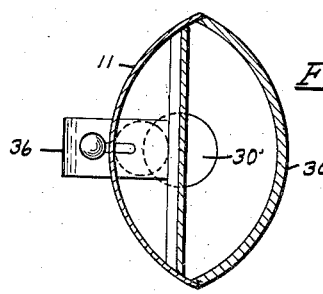

In the accompanying drawing, forming part hereof, Figure 1 is a perspective view of a planter embodying my improvements; Fig. 2, a transverse sectional view of the seed can having an inclined seed plate therein; Fig. 3, a transverse section of the seed can be equipped with a cotton pickerwheel, and Fig. 4 is a transverse sectional view through the seed can outlet, taken on the dotted line 4—4 in Fig. 2.

In said drawing the numerals 5, 6, indicate the frame of a planter the members of which are converged at their forward ends, as at 7, and to which a draft member 8 and shoes 9 are attached, as is common, a runner 10 of well known construction being supported by the frame, as is also a seed can 11, in any suitable manner. At the rear of the frame 5, 6, standards 14 are secured, and to which standards and said frame handles 15 are connected for guiding the implement, which is provided with supporting wheels 16 mounted upon a suitable axle 18, including a sprocket and chain mechanism connecting the axle and seeding device for operating the latter, as explained in my aforesaid application. While I have thus specifically described the planter structure illustrated it will be understood that my improved seeding equipment may be applied to planter frames of various constructions, but in that disclosed in Fig. 1 a sprocket 19 is mounted on axle 18 and connected by a chain 20 to a sprocket 21 on a jack-shaft 22, the latter carrying a bevel gear 23 engaging a bevel gear, as 24, for rotating a seed selecting and dropping plate 25, Fig. 2, or picker-wheel 26, Fig. 3, as may be installed in the seed can.

As disclosed in my aforesaid copending application, the seed can 11 at its lower end is connected to an inclined casting comprising a wall 30, bearing 31, and a seat element 32 providing individual seat portions 32$^a$ and 32$^b$ spaced from the wall to form a conduit 33, said seat having a port 34 therein, and through which bearing 31 a shaft 35 extends, having at its inner end a seed plate 25 cooperating with seat portion 32$^a$, or a picker-wheel 26 cooperating with seat portion 32$^b$, according to the seed to be planted, the casting terminating in a spout as 30', and the shaft 35 carrying the bevel gear 24 at its outer end. The seed plate 25, having a shield 37 thereover supported on seat portion 32$^b$, is so formed as to fit within the seat 32$^a$, the cups 25' of the plate coinciding with port 34 so that seed may be deposited in conduit 33, and the picker-wheel 26 is constructed in such manner as to cover port 34 to prevent seed in the can from passing through said port. As indicated in Fig. 3, the lower end of seat element 32 terminates in spaced relation to the wall of the spout 30', and which space may be opened or closed by a sliding valve 36 for a purpose to appear.

From the foregoing it will be understood that the seed dropping elements, as the plate 25 having the shield 37 thereover, or cotton pickerwheel 26 having teeth 26' on its periphery and agitators 26'' around its edge, are rotated when the planter is moving by reason of the gear connection between the jack-shaft 22 and inclined shaft 35. When plate 25 is rotated, which is installed for planting seeds other than cotton, the valve 36 is closed, so that the cups 25' of the plate, as is common, in selecting seed from the mass in can 11, carry the seed to the port 34, which seed travels down through channel 33 into spout 30' to be planted through a suitable tubular dropper (not shown); and when picker-wheel 26 is employed for planting cotton seed said shield 37 is removed and valve 36 is opened, Fig. 3, so that the light fluffy cotton material may be agitated to precipitate seeds therein directly through spout 30'.

It will be understood that the varieties of seeds planted by an implement of the character disclosed differ in size and dimensions, each requiring a specially designed seed plate, as 25, and by supplying such plates and the pickerwheel 26 of a uniform character to fit into seat 32 they may be readily interchanged in the seed can 11 for the particular seed to be planted, and, therefore, by employing driving mechanism substantially as that disclosed, or the equivalent thereof, in connection with such elements, but one implement is necessary or required for all the planting, and thus duplication of machinery is eliminated and time saved in the use of a single implement.

I claim as my invention:

1. In a planter, the combination of a frame, a receptacle on the frame, an inclined wall forming part of the receptacle, a seat mounted on and spaced from the wall to form a conduit for conducting seed to a point of discharge, a bearing connecting the wall and seat, a shaft in the bearing having a gear at its outer end, a seed dropping device on the shaft and rotatable within the seat, a driving shaft on the frame having a gear thereon engaging the gear on the first mentioned shaft, and means for rotating said driving shaft to actuate the seed dropping device to expel material from the receptacle.

2. In a planter, means providing a seed containing receptacle including an inclined seat-forming bottom portion of said receptacle, said portion providing an upper and lower port therein, closing means for the said lower port, a rotatable shaft projecting upwardly through said bottom portion, a conduit communicating with both said ports and terminating in a delivery outlet, said portion being adapted to receive interchangeable seed engaging elements for rotation thereon, and a seed-engaging element on the shaft, said element covering the upper port and directing seeds to the lower port, another of said elements being adapted to raise seeds to the upper port.

3. In a planter having a seed receptacle, unitary seed selecting and distributing mechanism supported by the receptacle comprising an integral inclined wall and a seat spaced therefrom to form a conduit therewith, said wall terminating in a spout, a bearing connecting the wall and seat; seed selecting and distributing means in the seat; a port in the seat communicating with the conduit, and a shaft in the bearing and connected to the seed selecting and distributing means for actuating the latter to discharge seed through said conduit and said spout.

DANIEL C. HEITSHU.